United States Patent
Carter et al.

(10) Patent No.: US 6,547,205 B2
(45) Date of Patent: Apr. 15, 2003

(54) ISOLATION PLATFORM ASSEMBLY FOR SUPPORTING AN INSTRUMENTATION PAYLOAD

(75) Inventors: Edward V. Carter, Edwardsville, IL (US); Jeffrey S. Fitzgerald, Florissant, MO (US)

(73) Assignee: Engineered Support Systems, Inc., St. Louis, MO (US)

( * ) Notice: Subject to any disclaimer, the term of this patent is extended or adjusted under 35 U.S.C. 154(b) by 0 days.

(21) Appl. No.: 09/844,942

(22) Filed: Apr. 27, 2001

(65) Prior Publication Data

US 2002/0158181 A1 Oct. 31, 2002

(51) Int. Cl.$^7$ .......................... F16M 13/00; F16M 1/00; F16M 5/00; F16M 7/00; F16M 9/00
(52) U.S. Cl. .................. 248/560; 248/550; 248/636; 248/638; 248/678
(58) Field of Search .................. 248/638, 550, 248/187.1, 678, 674, 560, 565, 566, 618, 636, 373, 619; 396/13, 428, 52, 53, 54, 55, 419, 421; 352/243

(56) References Cited

U.S. PATENT DOCUMENTS

| | | | | |
|---|---|---|---|---|
| 3,638,502 A | * | 2/1972 | Leavitt | 74/5.34 |
| 4,645,320 A | * | 2/1987 | Muelling | 354/81 |
| 4,752,791 A | * | 6/1988 | Allred | 354/81 |
| 4,783,038 A | * | 11/1988 | Gilbert | 248/570 |
| 5,169,110 A | * | 12/1992 | Snaith | 248/570 |
| 5,305,981 A | * | 4/1994 | Cunningham | 248/550 |
| 5,370,352 A | * | 12/1994 | Platus | 248/619 |
| 5,549,270 A | * | 8/1996 | Platus | 248/619 |
| 5,995,758 A | * | 11/1999 | Tyler | 396/13 |
| 6,022,005 A | * | 2/2000 | Gran | 267/136 |
| 6,059,253 A | * | 5/2000 | Koutsky | 248/550 |
| 6,263,160 B1 | * | 7/2001 | Lewis | 396/13 |

* cited by examiner

Primary Examiner—Anita King
Assistant Examiner—Amy J. Sterling
(74) Attorney, Agent, or Firm—Polster, Lieder, Woodruff & Lucchesi, L.C.

(57) ABSTRACT

An isolation platform assembly (10) for a vehicle (V) on which is mounted instruments and sensors (S). The instruments and sensors are installed on a gimbal (G). A mounting bracket (12a–12c) attaches the assembly to the vehicle. The unit further includes a platform or plate (14) to which the gimbal is attached. The plate connects to the bracket by cable isolators (62) which attenuate shock and vibration forces transmitted through the vehicle. This protects the instrument and sensor packages from shock and vibration damage, particularly when the vehicle is moving. It also allows the instruments and sensors to be used to obtain information both while the vehicle is parked and while it is moving. The assembly further includes a restraint mechanism (64) comprising torsion bars (66, 72) and levers (74, 108) which connect the platform to the mounting bracketry so to enable the instrumentation and sensor payload to be moved from one orientation to another for data acquisition.

30 Claims, 6 Drawing Sheets

ISOLATION PLATFORM ASSEMBLY FOR SUPPORTING AN INSTRUMENTATION PAYLOAD

BACKGROUND OF THE INVENTION

This invention relates to an assembly mounted on a vehicle for supporting instrumentation or sensor payloads externally of the vehicle and more particularly, to an isolation platform assembly which allows different suites of sensors to be installed on the vehicle and protected from damage while the vehicle is in transit, the platform assembly isolating the instruments from shocks and vibrations produced by the vehicle as it moves.

Sensor payload or suites of instruments are mounted externally on vehicles to collect various types of information. In co-pending, co-assigned U.S. patent application Ser. No. 09/755,819, which has now issued as U.S. Pat. No. 6,396,235, there is described a stabilized common gimbal (SCG) on which a primary suite of sensors is mounted, and on which a second and separate set of sensors can also be mounted. The types of instrumentation so mounted include electro-optic, microwave, optical and acoustic sensors; the particular instrumentation employed depending upon the particular usage of the vehicle. Because of the sensitivity of the instruments, they heretofore have been used only when the vehicle is parked; i.e., stationary. Prior to the vehicle moving from one location to another, the instruments are dismounted from the vehicle and stowed on or within the vehicle so they are not subjected to the shocks and vibrations created as the vehicle moves from one location to another. It will be understood that the types of vehicles on which the instruments are installed typically move over rugged terrain.

Clearly, while dismounting and stowing the instruments protects them from harm, there is a penalty incurred in the operational readiness of the vehicle because of the time required to remove and stow the instruments, and to subsequently unstow and reinstall them when the vehicle is parked at a new location. Another disadvantage is that it in certain environments, crew members must depart the vehicle to remove and later reinstall the equipment and in doing so are exposed to injury. Further, while the vehicle is able to engage in surveillance or data acquisition while stationary, it may be desirable to also acquire data while the vehicle is moving from one location to another. However, up until now, the risks of doing so have been outweighed by the advantages of protecting the crew and the instruments.

The apparatus of the present invention solves these problems by providing an isolation platform which enables a sensor payload to be mounted on the outside of a vehicle and to provide a mounting platform which alternates shock and vibrations to a level which is not damaging to the instruments so the instruments can be left in place while the vehicle is moving, and thus able to perform surveillance activities and data acquisition during vehicle transit.

BRIEF SUMMARY OF THE INVENTION

Among the several objects of the present invention is the provision of an isolation platform assembly mounted on a vehicle and used to support instruments and sensor payloads. An isolation platform of the assembly protects the instruments or sensors from damage due to vibrations and shock loading. Further, the isolation platform provides a rigid reaction to the instrumentation drive system so to sufficiently stabilize the instrument and sensor payload so accurate information can be gathered regardless of whether the vehicle is parked or moving.

Another object of the invention is an isolation platform assembly which is relatively lightweight and whose size allows it to be mounted at preferred locations on different vehicles. The assembly includes wire rope or cable isolators for attenutating the shock and vibrations created during vehicle movement. It also includes an anti-rotation bar mechanism to restrain roll, pitch, and yaw movements of the payload which is substantially constrained to linear motion of a gimbal on which the payload is mounted. All of this enhances sensor durability.

A further provision of the invention is that installation of the isolation platform substantially reduces crew vulnerability. This is because the assembly eliminates the need for personnel to leave the vehicle to dismount and stow the instrument payload prior to the vehicle being moved from one location to another, as well as having to again leave the vehicle to unstow and reinstall the payload when the vehicle reaches a new location. Rather, personnel can now remain in the vehicle at all times. In addition, operational readiness time of the vehicle and its crew is increased since the instruments are operational all the time.

Briefly stated, the present invention is directed to an isolation platform assembly for use on a vehicle on which is mounted sensitive equipment including electronic equipment and sensors. The instruments and sensors are installed on a gimbal. The isolation platform assembly first includes a bracket for mounting the assembly on the vehicle. The unit further includes a plate to which the gimbal is attached. The plate connects to the mounting bracket by isolators which attenuate shock and vibration forces transmitted through the vehicle. As a result, the instrument and sensor packages are protected from shock and vibration damage, particularly when the vehicle is moving. This is important because it allows the instruments and sensors to be used to obtain information both while the vehicle is parked and while it is moving. The assembly further includes a series of rods and levers forming a restraint mechanism which restrains platform motion and that of the sensor payload mounted on the platform assembly. The assembly is particularly advantageous in that the instruments and sensors mounted on the platform can now be used for surveillance and data acquisition both while the vehicle is stationary or moving. Other objects and features will be part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

Corresponding reference characters indicate corresponding parts throughout the several views of the drawings.

DETAILED DESCRIPTION OF INVENTION

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Referring to the drawings, a vehicle V has an outer surface or deck D. It will be understood that the deck can be a rear deck of the vehicle, a roof portion of the vehicle, or other convenient location on the vehicle. A gimbal assembly G such as the stabilized common gimbal described in the co-pending, co-assigned patent application previously referred to has various instruments or sensors mounted on it. For example, a first sensor or sensor suite S1 comprises a camera pod including a camera and its associated optics. A second sensor or sensor suite S2 comprises a forward looking infrared or FLIR assembly. The sensors or instruments are well-known in the art and are not described. Sensors S1 and S2 are shown mounted on opposite sides of the gimbal assembly. Although not shown, a third sensor S3 comprising a radar may be installed on top of the gimbal. Those skilled in the art will appreciate that other instruments or sensors, such as those mentioned in the Background section of this Specification, may be mounted on the gimbal assembly besides those mentioned herein. It is a feature of the stabilized common gimbal that the sensor payload S1 is boresighted in accordance with an automated procedure.

As discussed above, it has previously been necessary to remove and stow the various instruments and sensors whenever the vehicle is to be moved. This was because of the damage which could be done to the instruments and sensors due to vehicle vibrations and road shocks which occur as the vehicle moves. In addition to the time required to uninstall, stow, unstow, and reinstall the payload, personnel performing these tasks could be at risk. With an isolation platform assembly 10 of the present invention, this is no longer necessary. Rather, the payload now remains mounted in place at all times with the instruments and sensors being used for information gathering both while the vehicle is parked as well as when it is traveling.

Assembly 10 is comprised of three components. First, is a bracket assembly indicated generally 12 for mounting assembly 10 to the exterior deck surface of the vehicle. Second, is a platform or plate indicated generally 14 on which the instruments and/or sensors comprising a payload are mounted. Third, is an isolation means indicated generally 16 by which platform 14 is attached to bracket 12. This isolation means attenuates shocks and vibrations transmitted through the vehicle and which would otherwise damage the instrument and sensor payload. The isolation means therefore provides a stable mounting platform for the payload which enables use of the instruments and sensors for information gathering or acquisition regardless of whether the vehicle is stationary or in motion.

Figure 2:
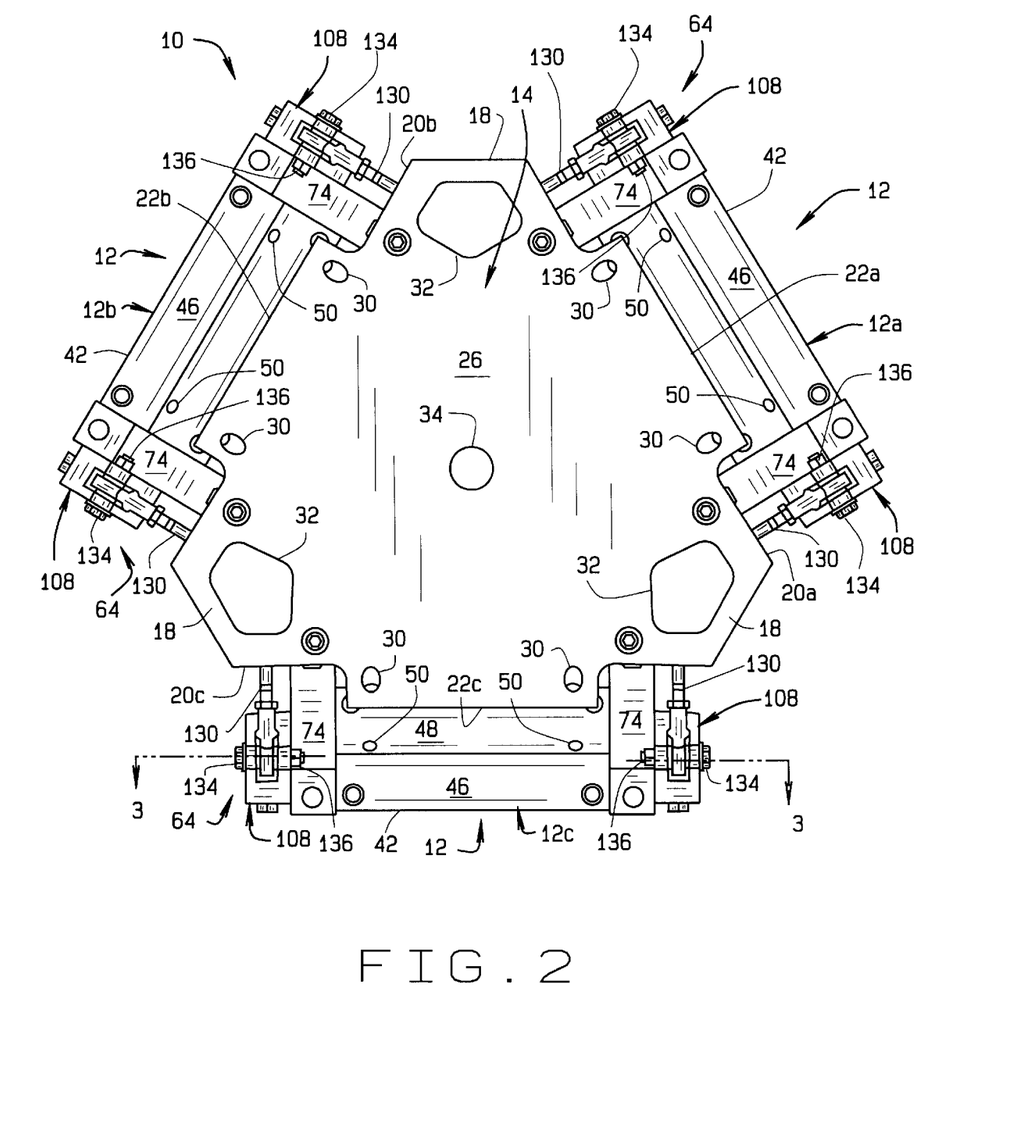
FIG. 2 top plan view of the assembly.

Referring to FIG. 2, plate 14 is shown to be generally triangular in shape when viewed in plan and of a single-piece construction. The corners of the plate are truncated as indicated at 18. Intermediate the length of each side 20a–20c of the plate is an integrally formed outwardly extending rectangular shaped projection 22a–22c respectively. The outer wall 24 of each projection slopes diagonally inwardly from a top surface 26 of the plate to a bottom surface 28 thereof (see FIGS. 3 and 5). Adjacent the ends of each projection are slots 30. The upper end of each slot opens into top surface 26 of the plate. The other end of each slot opens into wall 24 of the respective projection 22a–22c. As described hereinafter, the slots are used for attaching plate 14 to isolation means 16. At each truncated corner of plate 14 there is formed a generally pentagonal shaped opening 32. A circular opening 34 is formed in the middle of the plate. Gimbal G is attached to the plate using this opening.

Figure 5:
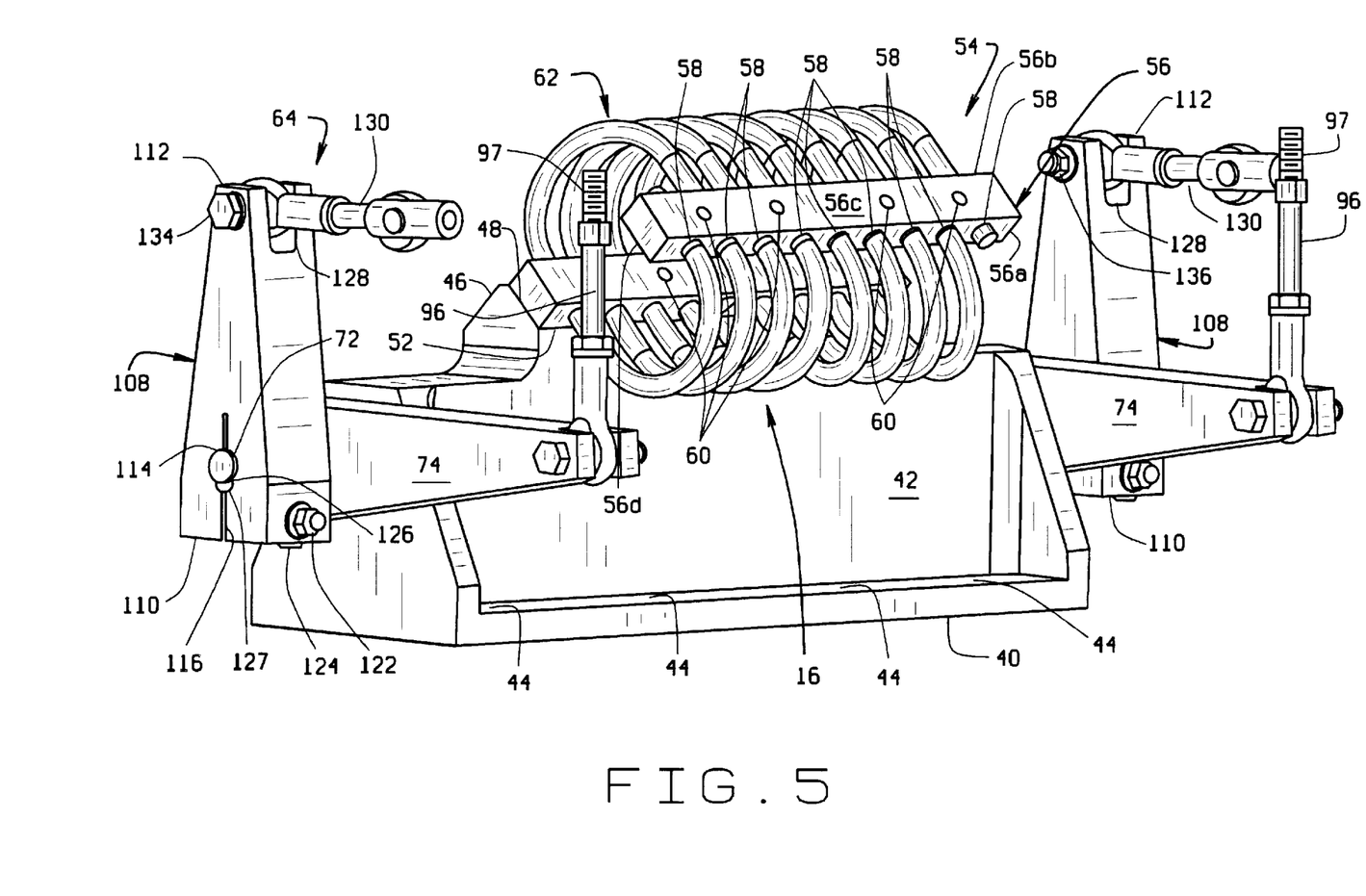
FIG. 5 is a perspective view of one bracket of the assembly showing both isolator coils and a lever/rod arrangement used to absorb shock and vibration forces; and, FIG. 6 is a perspective, exploded view of a restraint mechanism of the isolation platform assembly.

Bracket 12 consists of three separate, identically formed bracket members 12a–12c. Each bracket member is separately mounted to surface D of vehicle V, and each bracket member is used for attaching a portion of isolation means 16 to one side 20a–20c of plate 14. A base 40 of each bracket member has an outer, vertically extending wall 42 of the member which has a generally L-shape. As shown in FIG. 5, a series of vertically extending, spaced openings 44 extend through base 40 of the bracket member. These openings accommodate bolts (not shown) for mounting the bracket member to the vehicle. At the top of each wall 42, intermediate the length of the wall, there is formed a vertical extension 46. An inner face 48 of extension 46 slopes inwardly from the top of the extension toward the base of the bracket member (see FIGS. 3 and 5). Bores 50 are formed in each face 48, at each end of each extension 46, for attaching a base plate 52 of isolation means 16 to the bracket member.

Figure 1:
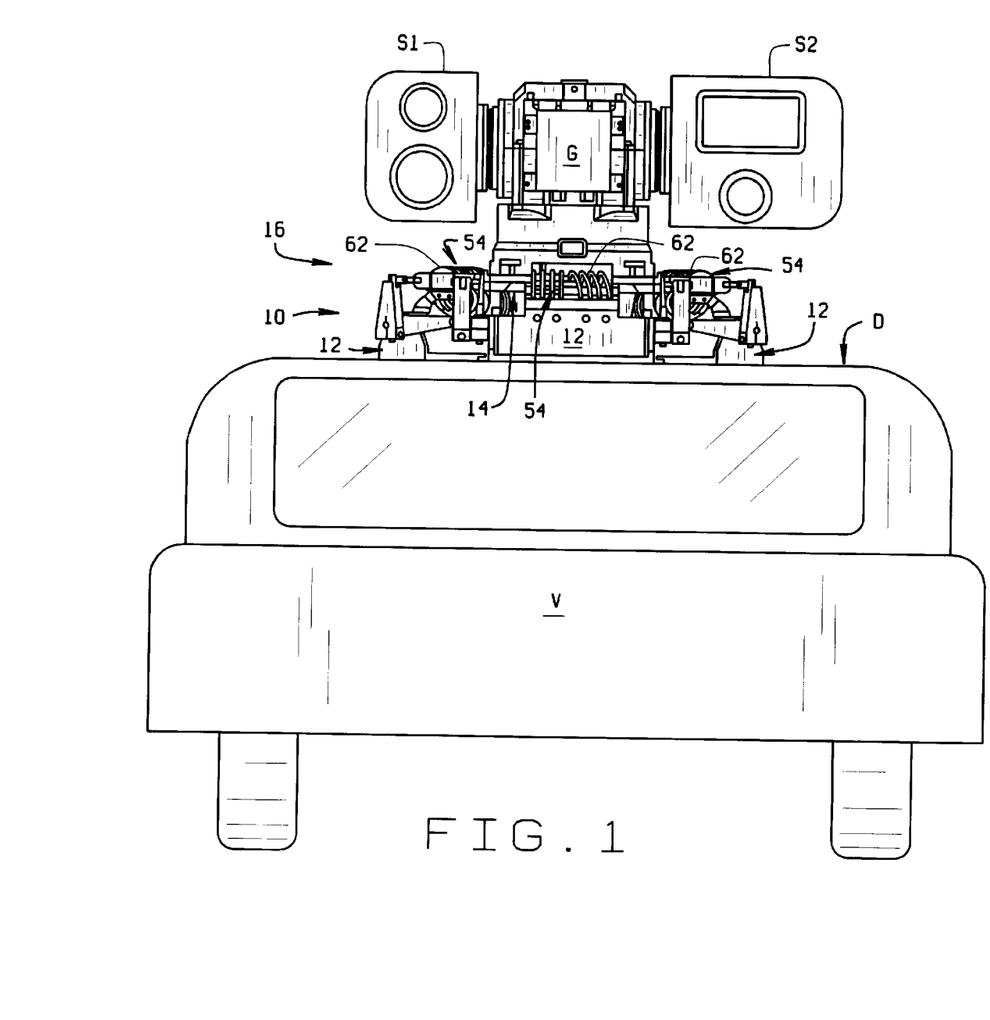
FIG. 1 an elevational view of an isolation platform assembly of the present invention with instrumentation/sensor payload mounted on it.

Isolator means 16 includes a cable isolator 54 which is connected to both plate 14 and to one of the bracket members 12a–12c. Accordingly, isolation means 16 includes three cable isolators 54 as shown in FIG. 1. Each cable isolator includes a first base plate 52; which, as noted, attaches to face 48 of one of the bracket members. The cable isolator further includes a second base plate 56, substantially identical to base plate 52, which attaches to outer wall 24 of one of the plate 14 projections 22a–22c. Each base plate has a series of uniformly spaced bores 58 (see FIG. 5) extending transversely of a longitudinal axis of the plate from one end of the plate to the other. As shown in FIG. 5, the bores extend through the base plate from one side 56a to an opposite side 56b of the plate. Additional spaced bores 60 also extend through the plate transversely of the longitudinal axis of the base plate. These bores extend from one side 56c of the plate through to the opposite side 56d of the plate. The bores 60 accommodate bolts (not shown) for mounting the respective plate 52 or 56 to the bracket member or plate.

Each cable isolator further comprises a multi-strand wire cable 62. This cable, which is commercially available, is threaded through the bores 58 formed in the base plates 52, 56 so to form a coil extending from one end of each cable isolator to the other. Although not shown in the drawings, it will be understood by those skilled in the art that more than one cable 62 can be used with each isolator 54, each cable 62 extending a portion of the length of the isolator.

The cable isolators, when mounted in place, serve to connect platform 14 to bracket assembly 12. However, the cables 62, while sufficiently strong so as to support the platform in a spaced relationship to the bracket members, are also flexible. This flexibility allows the cable to substantially lessen the shock and vibration forces which are produced when vehicle V is moving and which would otherwise be transmitted to gimbal assembly G and the sensor suites S1, S2 mounted on the gimbal assembly. Use of the cable isolators rather limits movement of the platform as the vehicle moves so that the magnitude of any shock and vibration forces transmitted to the gimbal assembly and sensors or instruments is well within the capabilities of them to withstand without being damaged. This helps achieve various of the advantages previously referred to. That is, it allows the sensor payload to remain installed at all times. This results in significant savings in manpower since the payload does not have to be stowed and unstowed before each move. In addition, because the platform remains stable while the vehicle is moving, the instruments can be used for surveillance and data acquisition even while the vehicle is moving.

Figure 3:
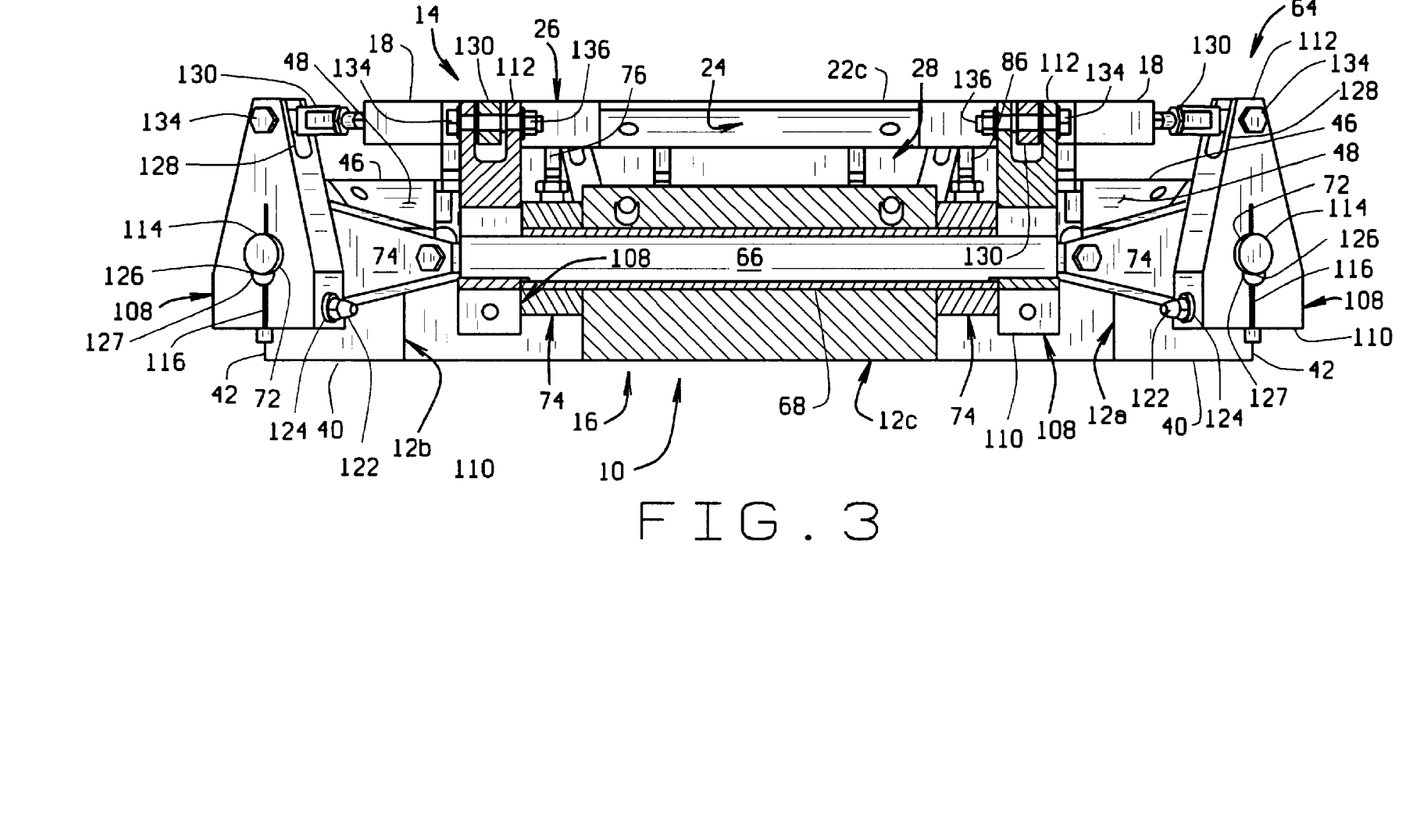
FIG. 3 elevational view of the assembly partly in section.
Figure 4:
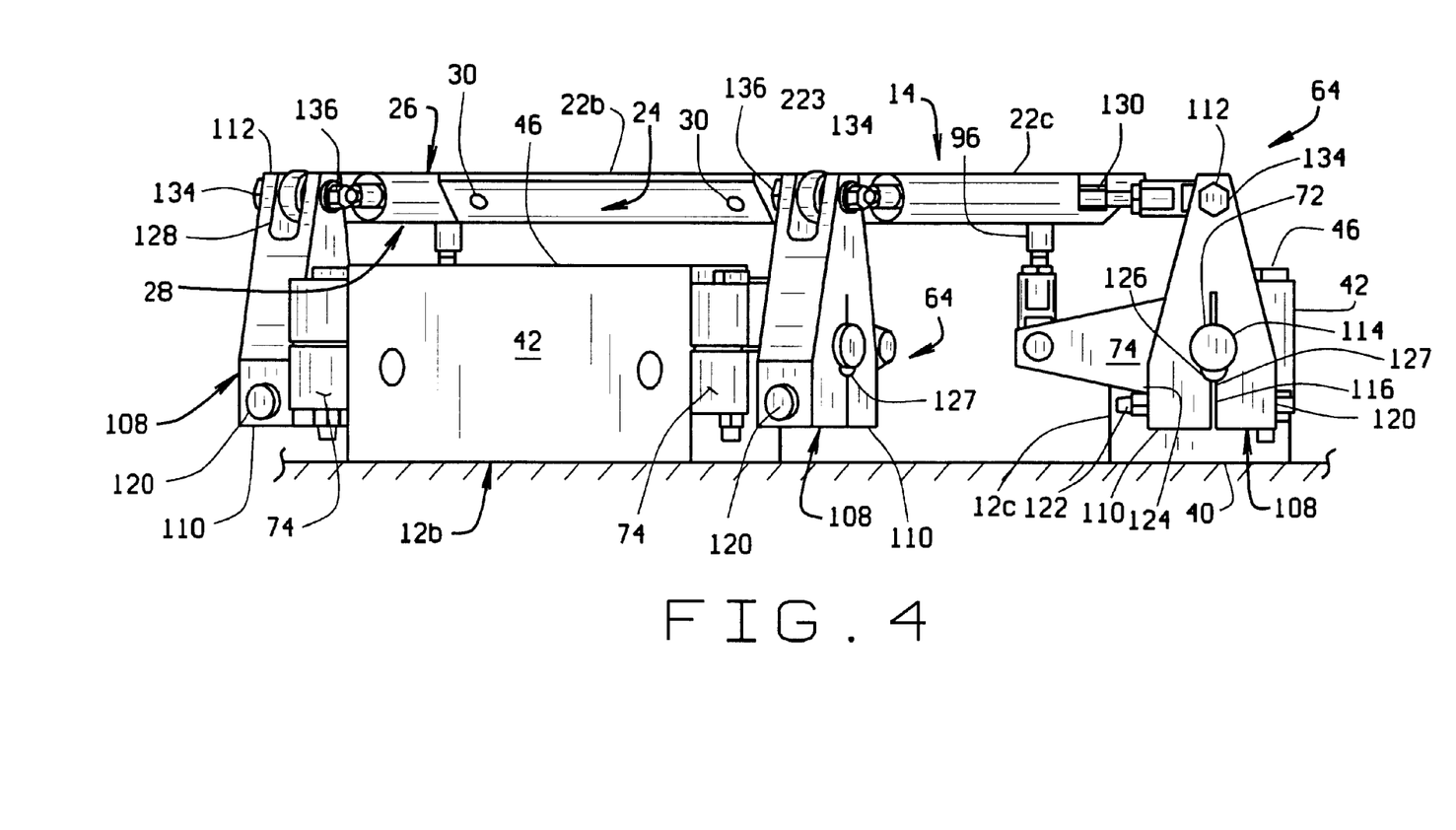
FIG. 4 is another elevational view of the assembly.
Figure 6:
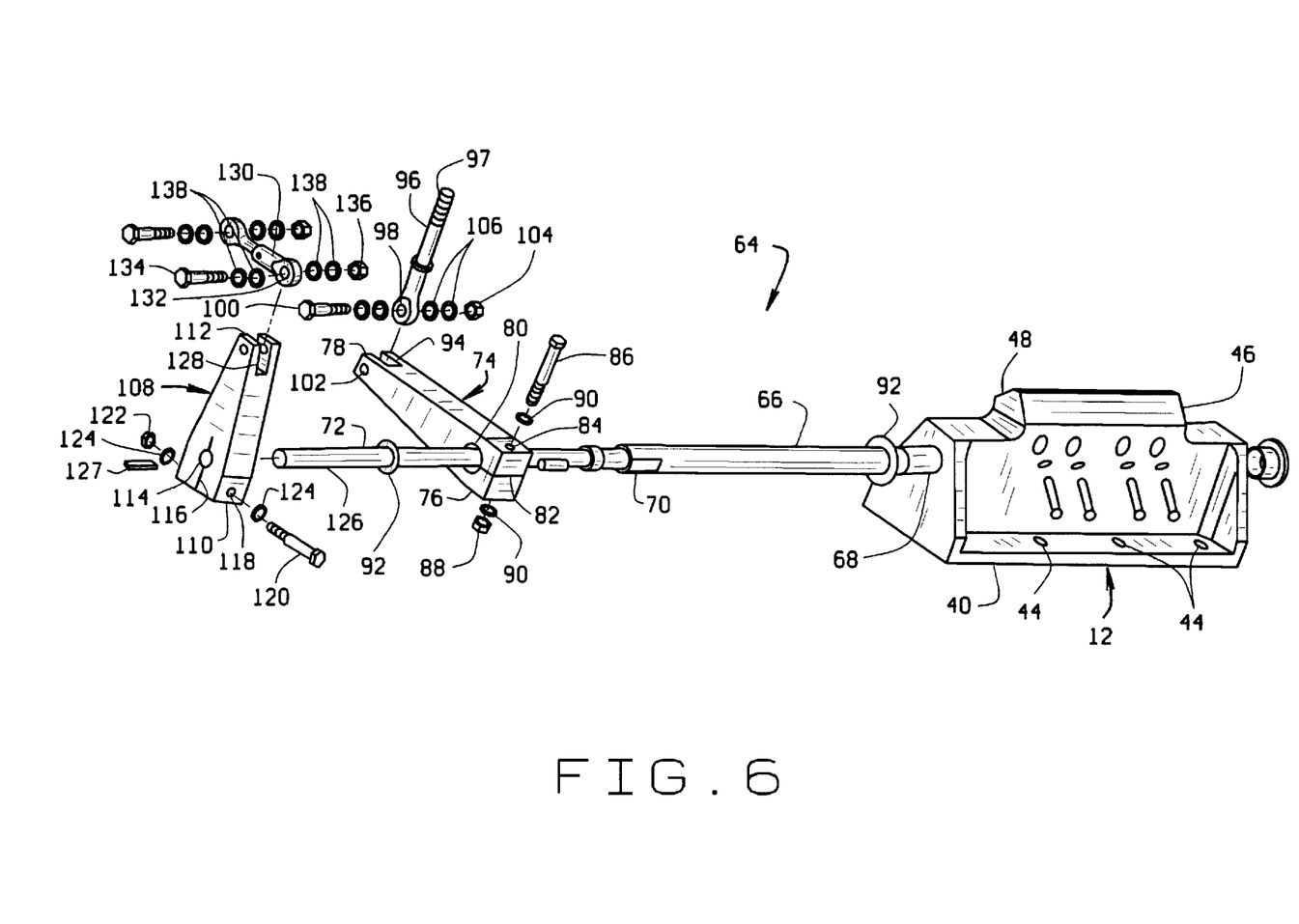

With some payload installations, it is desirable to be able to move the sensors or instruments in order to provide adequate surveillance or acquire desired information. With the installation shown in the drawings, this involves moving the gimbal assembly and/or sensor packages S1, S2 installed on the gimbal assembly. In order that the forces generated to produce such motion are utilized effectively, efficiently and in a controlled manner which does not damage the gimbal and instruments or sensors, a restraint mechanism indicated generally 64 is shown in the drawings. Referring to FIG. 3, the portion of assembly broken away along lines 3—3 in FIG. 2 is shown to include a pitch torsion bar 66 which extends through a longitudinal bore 68 formed in bracket member 12c. Bar 66 is sufficiently long so that the respective ends of the bar extend beyond the sides of the bracket member. As shown in FIG. 6, each end of bar 66 is slotted, as at 70, for interconnection with a yaw torsion bar 72 that extends outwardly from the end of bar 66. In FIG. 3, however, the pitch and yaw torsion bars are shown to be a single piece rod.

A pair of pitch levers 74 are mounted on the respective ends of pitch torsion bar 66. The two pitch levers are identically formed, each lever tapering in height from its outer end 76 which is mounted on bar 66 towards its inner end 78. An opening 80 adjacent the outer end of the lever allows the lever to be inserted onto the end of bar 66. A slit 82 extends between this opening and the outer end of the lever. A vertical bore 84 extends through the pitch lever outwardly of opening 80. The bore is sized for a bolt 86 to be inserted through it so to attach the lever to bar 66 using a nut 88 and washers 90. A pair of bushings 92 are also installed on pitch torsion bar 66, one bushing being between the bracket member and an inner face of lever 74, and the other bushing on the opposite side of the pitch lever.

A slot 94 extends inwardly into the body of pitch lever 74 from inner end 78 of the lever. The slot is sufficiently wide to accommodate one end of a shaft 96 the other end 97 of which is threaded for attaching the shaft to the underside of plate 14 (see FIG. 5). The end of the shaft fitting in slot 94 is a bulbous end in which is formed an opening 98 for attaching the shaft to pitch lever 74 using a bolt 100 which fits through a transverse bore 102 extending from the sides of the pitch lever and slot 94. The bolt is inserted through one side of the pitch lever into the slot, through opening 98 in the shaft, and through the opening on the other side of the slot. A nut 104 and washers 106 are used with the bolt to secure shaft 96 in place. When fitted in place, shaft 96 is rotatably secured to the pitch lever.

A pair of yaw levers 108 similar in construction to the pitch levers are installed on the outer ends of the respective yaw torsion bars 72. If the bar is a single piece rod as shown in FIG. 3, the yaw levers are mounted on the outer ends of the rod outwardly of the respective pitch levers. The two yaw levers are also identically formed, each lever tapering in height from an outer end 110 which is mounted on bar 72 to an inner end 112. An opening 114 adjacent the outer end of the lever facilitates insertion of the lever onto the outer end of bar 72. A slit 116 extends between this opening and outer end of the lever, and a bore 118 extends through the yaw lever outwardly of opening 114. As before, this bore is sized for a bolt 120 to be inserted through it and attach the yaw lever to bar 72 using a nut 122 and washers 124. As shown in FIGS. 3–6, the outer end of yaw torsion bar 72 has a flattened section 126. In FIG. 6, a semi-cylindrical insert 127 is shown. This insert fits into opening 114 and has a flat face which abuts flattened section 126 of bar 72. The insert is used to facilitate adjustment of the yaw lever onto yaw torsion bar 72.

A slot 128 extends inwardly into the body of yaw lever 108 from end 112 of the lever. The slot is sufficiently wide to accommodate one end of a turnbuckle 130. This end of the turnbuckle has an opening 132 formed in it for attaching the turnbuckle to yaw lever 108 using a bolt 134 which extends through a transverse bore 136 extending from the sides of the yaw lever and slot 128. The bolt is inserted through one side of the yaw lever into slot 128, through opening 132, and through the opening on the other side of the slot. A nut 136 and washers 138 are used with the bolt to secure the turnbuckle to the yaw lever.

The other end of the turnbuckle is a threaded end (not shown). This end of the turnbuckle is inserted through an opening in the sidewall of plate 14. The opening extends from the side of the plate into a sidewall of one of the pentagonal shaped openings 32 formed in the plate (see FIG. 2). A fastener (not shown) is threaded into this end of the turnbuckle to attach the turnbuckle to the plate.

As shown in the drawings, restraint mechanism 64 includes three sets of pitch levers 74 and yaw levers 108 which are attached to platform 14. Each set, one for each bracket member, includes a pair of each lever. The levers are individually mounted in place and are separately adjustable using the end 97 of shaft 96 for the pitch levers 74, or the turnbuckles 130 for the yaw levers 108. As noted above, the restraint mechanism enables the gimbal G and sensor payloads S1, S2 to be oriented and positioned, as needed, to conduct surveillance or obtain data.

What has been described is an isolation platform assembly installed on a vehicle on which is mounted a payload of sensitive electronic equipment and sensors. The isolation platform assembly includes a plurality of bracket members for mounting the assembly on the vehicle. A plate on which the payload is mounted connects to the bracket members by isolators which attenuate shock and vibration forces transmitted through the vehicle. A restraint mechanism includes a series of rods and levers which restrain platform motion and that of the sensor payload mounted on the platform assembly. The assembly is particularly advantageous in that the instrument payload can remain in place at all times, regardless of whether the vehicle is parked or moving. Further, the sensors can now be used for surveillance and data acquisition both while the vehicle is stationary or moving.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by letters patent is:

1. An assembly mounted on a vehicle for supporting one or more instruments or sensors used to acquire data both while the vehicle is parked, and while it is moving, the assembly comprising:

a bracket attached to an exterior surface of the vehicle;

a platform on which instruments and sensors comprising a payload thereof are mounted, the platform comprising a multi-sided plate and the bracket including a plurality of bracket members separately attached to the exterior surface of the vehicle, there being one bracket member for each side of the plate;

isolation means by which the platform is attached to the bracket, the isolation means attenuating shocks and vibrations transmitted through the vehicle and which would otherwise damage the instrument and sensor payload, the isolation means thereby providing a stable mounting platform for the payload enabling use of the instruments and sensors for information acquisition regardless of whether the vehicle is stationary or in motion; and, an integrally formed outwardly extending projection intermediate the length of each side of the plate for use in attaching the plate to the isolation means, each projection having an outer wall sloping diagonally inwardly from a top surface of the plate to a bottom surface thereof and slots are formed in the plate adjacent each end of each projection with an upper end of each slot opening into the top surface of the plate and with the other end of the slot opening into the outer wall of the respective projection, the slots accommodating fasteners for attaching the plate to the isolation means.

2. An assembly mounted on a vehicle for supporting one or more instruments or sensors used to acquire data both while the vehicle is parked, and while it is moving, the assembly comprising:

a bracket attached to an exterior surface of the vehicle;

a platform on which instruments and sensors comprising a payload thereof are mounted; and, isolation means by which the platform is attached to the bracket, the isolation means attenuating shocks and vibrations transmitted through the vehicle and which would otherwise damage the instrument and sensor payload, the isolation means thereby providing a stable mounting platform for the payload enabling use of the instruments and sensors for information acquisition regardless of whether the vehicle is stationary or in motion, the platform including a multi-sided plate, the bracket including a bracket member attached to the vehicle for each side of the plate, and the isolation means includes a cable isolator for each bracket member.

3. The assembly of claim 2 wherein the instrument and sensor payload is movable relative to the vehicle, and the assembly further includes a restraint mechanism enabling the payload to be moved from one orientation relative to the vehicle to another orientation.

4. The assembly of claim 2 wherein the platform comprises a multi-sided plate and the bracket includes a plurality of bracket members separately attached to the exterior surface of the vehicle, there being one bracket member for each side of the plate.

5. The assembly of claim 4 wherein the plate is of a single piece construction.

6. The assembly of claim 4 further including an integrally formed outwardly extending projection intermediate the length of each side of the plate for use in attaching the plate to the isolation means.

7. The assembly of claim 6 wherein each projection has an outer wall sloping diagonally inwardly from a top surface of the plate to a bottom surface thereof and slots are formed in the plate adjacent each end of each projection with an upper end of each slot opening into the top surface of the plate and with the other end of the slot opening into the outer wall of the respective projection, the slots accommodating fasteners for attaching the plate to the isolation means.

8. The assembly of claim 2 wherein each cable isolator connects to both the plate and to a bracket member.

9. The assembly of claim 8 wherein each cable isolator includes a first base plate which attaches to the bracket member, and a second base plate which attaches to the platform.

10. The assembly of claim 9 wherein the two base plates are identically formed.

11. The assembly of claim 9 wherein each base plate includes a first series of spaced bores extending transversely of a longitudinal axis of the base plate from one end of the base plate to the other.

12. The assembly of claim 11 wherein each base plate further includes a second series of spaced bores extending through the base plate, the bores comprising said second series sized to accommodate fasteners used to mount the base plate to the bracket member or to the plate.

13. The assembly of claim 11 further including a cable threaded through the first series of bores in each of the base plates so to form a coil extending from one end of each cable isolator to the other, the coil being sufficiently strong so as to support the plate in a spaced relationship to the bracket member and sufficiently flexible so as to attenuate shock and vibration forces produced when the vehicle is moving and which would otherwise be transmitted to the payload.

14. The assembly of claim 13 wherein the cable is a wire cable.

15. The assembly of claim 13 wherein the cable is a multi-stranded cable.

16. The assembly of claim 13 further including a plurality of cables threaded through the first series of bores in each of the base plates so to form the coil, each of the cables extending a portion of the length of the cable isolator.

17. The assembly of claim 4 wherein a restraint mechanism counteracts the forces produced by movement of the sensors and instruments to prevent damage thereto.

18. The assembly of claim 17 wherein the restraint mechanism includes a torsion bar extending through a longitudinal bore formed in each bracket member.

19. The assembly of claim 18 wherein the length of the torsion bar is such as to extend beyond the ends of the bracket member and the restraint mechanism further includes a pair of pitch levers one of which is attached to each end of the torsion bar.

20. The assembly of claim 19 wherein the restraint mechanism further includes a pair of yaw levers one of which is also attached to each end of the torsion bar.

21. The assembly of claim 20 wherein each pitch lever and each yaw lever is separately and adjustably connected to the plate.

22. An isolation platform assembly mounted on a vehicle and supporting a payload of instruments or sensors used to acquire data both while the vehicle is parked, and while it is moving, the assembly comprising:

a platform on which the payload is mounted, the platform comprising a multi-sided plate;

a plurality of bracket members mounted to an exterior surface of the vehicle, the plate being supportingly attached to each of the bracket members;

isolation means for attaching the plate to each bracket member, the isolation means including a coil attached to both one side of the plate and to an adjacent bracket member, the coil attenuating shocks and vibrations transmitted through the vehicle thereby to provide a stable mounting platform for the payload; and, a restraint mechanism interconnecting the plate and the bracket members to enable the sensors and instruments comprising the payload to be movable from one orientation to another to provide surveillance or acquire desired information while the vehicle is stationary or moving.

23. The assembly of claim 22 wherein the isolation means further includes a first base plate which attaches to the bracket member, and a second base plate which attaches to the plate.

24. The assembly of claim 23 wherein each base plate includes a first series of spaced bores extending transversely of a longitudinal axis of the base plate from one end of the base plate to the other, and further includes a second series of spaced bores extending through the base plate, the bores comprising said second series sized to accommodate fasteners used to mount the base plate to the bracket member or to the plate.

25. The assembly of claim 24 further including a cable threaded through the first series of bores in each of the base plates so to form said coil, the coil extending from one end of each cable isolator to the other, the coil being sufficiently strong so as to support the plate in a spaced relationship to the bracket member and sufficiently flexible so as to shock and vibration forces produced when vehicle is moving and which would otherwise be transmitted to the payload.

26. The assembly of claim 25 further including a plurality of cables threaded through the first series of bores in each of the base plates so to form the coil, each of the cables extending a portion of the length of the cable isolator.

27. The assembly of claim 22 wherein the restraint mechanism includes a torsion bar extending through a longitudinal bore formed in each bracket member.

28. The assembly of claim 27 wherein the length of torsion bar is such as to extend beyond the ends of the bracket member and the restraint mechanism further includes a pair of pitch levers one of which is attached to each end of the torsion bar.

29. The assembly of claim 28 wherein the restraint mechanism further includes a pair of yaw levers one of which is also attached to each end of the torsion bar.

30. The assembly of claim 29 wherein each pitch lever and each yaw lever is separately and adjustably connected to the plate.

* * * * *